United States Patent

[11] 3,591,825

[72] Inventor Charles Keighley, Jr.
R.D. #1 Box 489-X, Uniontown, Pa. 15401
[21] Appl. No. 833,082
[22] Filed June 13, 1969
[45] Patented July 6, 1971

[54] CLOCK AND LIGHT-SENSITIVE LIGHT CONTROL SYSTEM FOR MOTOR VEHICLES
8 Claims, 1 Drawing Fig.

[52] U.S. Cl. .................................. 315/82,-
315/159;360
[51] Int. Cl. .................................. B60g 1/08,
H05b 37/02
[50] Field of Search ........................... 315/83,
360, 77, 82, 149, 159

[56] References Cited
UNITED STATES PATENTS
| | | | |
|---|---|---|---|
| 1,418,748 | 6/1922 | Tregoe et al. | 315/360 X |
| 1,520,040 | 12/1924 | Waldorf | 315/360 X |
| 2,029,502 | 2/1936 | Paulson | 315/360 X |
| 2,295,894 | 9/1942 | Dewan | 315/360 X |
| 2,944,188 | 7/1960 | Lohr et al. | 315/83 |
| 3,349,281 | 10/1967 | Collins | 315/83 |

Primary Examiner—Roy Lake
Assistant Examiner—E.R LaRoche
Attorney—Brown, Murray, Flick & Peckham ABSTRACT: An electric line connects a battery with the lights of a motor vehicle and includes a normally closed switch, between which and the battery there is a manually operable switch. Electrically operated means are provided for opening the normally closed switch and connecting the lights to the battery directly. Connected with said means is a normally open switch operated by a photoelectric cell. A clock-actuated switch connects the battery with said means from dusk to dawn and with the normally open switch and the cell from dawn to dusk. While the cell is connected with the battery, it closes the normally open switch whenever the cell fails to receive enough illumination.

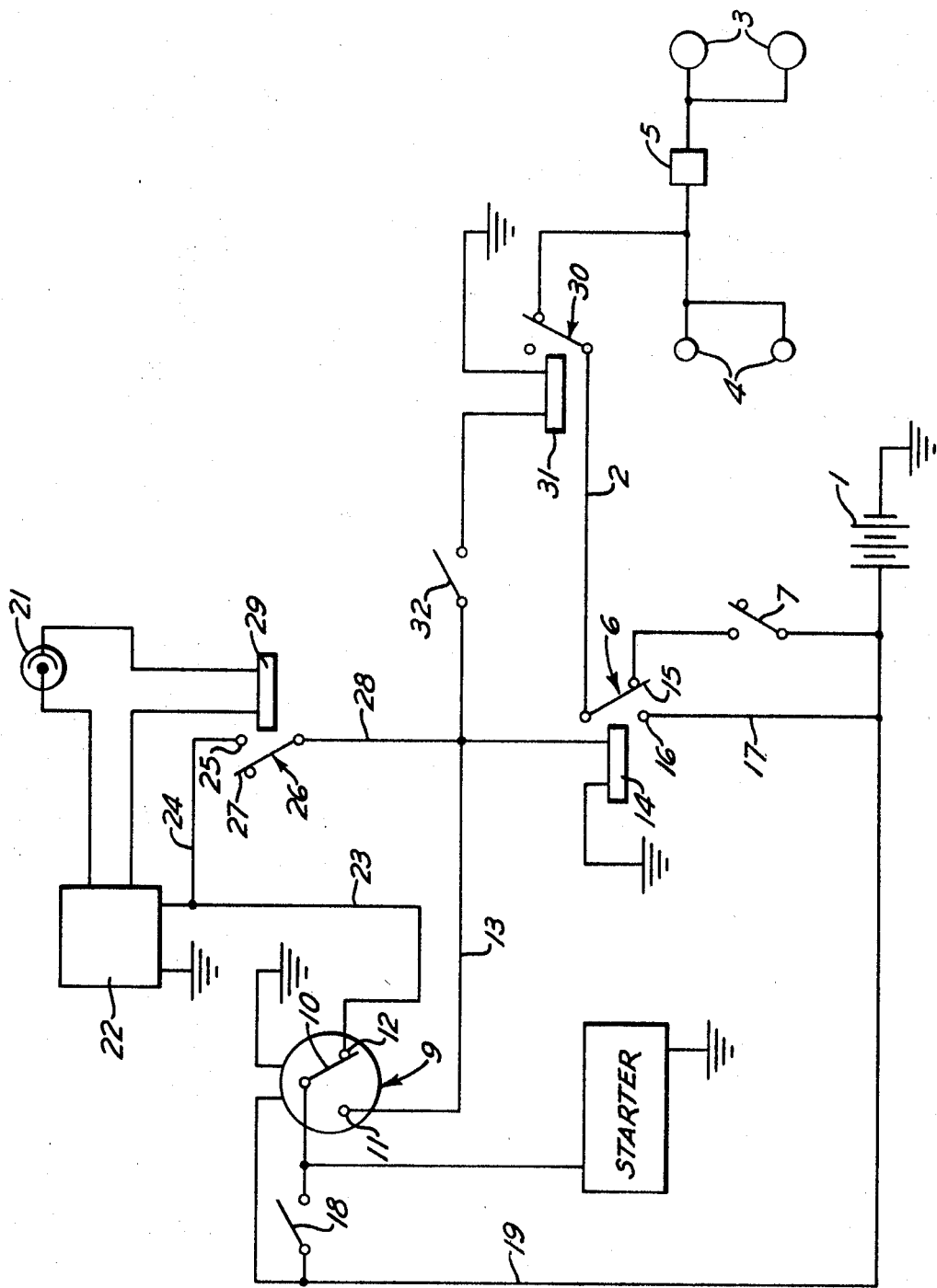

CLOCK AND LIGHT-SENSITIVE LIGHT CONTROL SYSTEM FOR MOTOR VEHICLES

One of the many hazards of driving or riding in an automobile or truck is that the lights on that vehicle or on an approaching vehicle may not be turned on when conditions are such that they should be lighted. This lack of illumination may cause an accident. Failure to turn on the lights occurs most frequently as it is getting dark in the evening or when the vehicle starts out from a well-lighted area at night. Occasionally a daytime storm may so darken the sky that the lights should be turned on, or the vehicle may enter a tunnel, and yet the driver may neglect to switch on the lights.

It is among the objects of this invention to provide an electrical system for a motor vehicle which automatically turns on the lights during hours of darkness whenever the ignition key is turned on, which also automatically turns on the lights during certain hours of the day whenever the ambient illumination falls below a predetermined level, and which permits the lights to be controlled manually as well as automatically during the daylight hours.

The single FIGURE of the drawing is an electrical diagram of the system during its daytime setting, illustrating this invention.

Referring to the drawing the usual motor vehicle battery 1 is connected by an electric line 2 with the headlights 3 and taillights 4 of a vehicle. There is the usual dimmer switch 5 in the circuit. The electric line includes a normally closed switch 6, between which and the battery there is the usual manually operable light switch 7.

An electric clock 9 is provided that may be driven from battery 1 or from a separate battery. A separate battery will prevent the clock from being affected in case the battery is run down, such as by difficult starting on a cold morning. This clock operates in a well-known manner the movable contact 10 of an electric switch that has two fixed contacts 11 and 12. One of these contacts is connected by a wire 13 to a solenoid 14 which, when energized, will open switch 6 and cause its movable contact 15 to engage another fixed contact 16 that is connected by a wire 17 directly to the battery. When contact 16 is engaged, the lights are turned on even though switch 7 is open. The movable contact of the clock switch is connected to one side of a manual switch 18, which preferably is the ignition switch of the vehicle. The other side of this manual switch is connected by a wire 19 directly to the battery. Consequently, while the movable contact 10 of the clock switch is in engagement with its contact 11, which will be during the hours of darkness and as late in the morning and as early in the evening as desired, the lights will be lit automatically whenever the ignition switch is closed to start the engine of the vehicle. This will eliminate the danger of driving without lights at any time during that period.

Another feature of this invention is that even during the normal hours of daylight the lights will be switched on automatically whenever it becomes so dark that they should be turned on. Accordingly, the circuit is provided with a photoelectric cell 21 responsive to the ambient light for controlling the vehicle lights during the time that the night automatic control is not being used. This cell may receive its power from an inverter 22 connected by a wire 23 to the second fixed contact 12 of the clock switch. This same wire is connected by a wire 24 to a contact 25 of a normally open switch 26, the other contact of which is connected by a wire 28 with a solenoid 14. The inverter and the cell are wired to a solenoid 29 which, when energized, will close switch 26. This closing occurs whenever the intensity of the illumination falling on the cell falls below a given safe point. The cell, however, can only operate during daylight hours, because that is the only period when the movable contact of the clock switch engages the fixed contact 12 to connect the battery with the inverter and switch 26. As will be seen, switch 26 and solenoid 29 form a relay.

Assuming that it is daylight, so that the inverter is connected with the battery as shown, the switch 26 ordinarily will be open but, if it becomes dark enough outside, the cell will energize the solenoid 29 and close that switch. This will connect solenoid 14 with the battery by way of switch 26 and the clock switch, so the solenoid will pull movable contact 15 against contact 16 to connect the lights directly with the battery while switch 7 remains open.

The clock should be set to trip its switch about a half hour before dusk in order to turn on the lights automatically, provided manual switch 18 is closed, and to again trip it about a half hour after dawn in order to turn off the lights. On the other hand, from a half hour after dawn until a half hour before dusk the clock will connect the photoelectric cell with the battery, so that if at any time the vehicle should require illumination the cell will close the normally open switch 26 to cause the lights to be turned on independently of the driver.

If an ordinary clock is used, its timer for tripping the switch must be changed periodically, due to the fact that the hours of daylight and darkness change in length from day to day. This attention to the clock can be avoided if an astronomical clock is used. Such a clock, which is well known, automatically compensates for the time variation for dawn and dusk and therefore the switch will be tripped every day at the correct time for that particular time of the year.

In view of the fact that the driver of the vehicle has no control over the lights at night through light switch 7, because it has been switched out of the circuit, it may be desirable to provide a special switch by which he can turn off the lights at night while the vehicle is parked, even though he wishes to keep the engine running. This can be done by placing a normally closed switch 30 in line 2 between switch 6 and the lights. The switch 30 can be opened by a solenoid 31 that is connected through a normally open manual switch 32 with contact 11 of the clock switch. Switch 30 and the solenoid 31 form a relay. When switch 32 is closed, the relay will be energized and that will open the circuit to the lights. Before the car is moved, switch 32 should be opened so that the lights will be turned on again. There is little likelihood of the driver forgetting to open the switch, because it will be dark out and he will need the lights. As a further precaution, this switch can be made to operate by a key and it can be provided with a red reminder light. It also is useful for keeping the lights off in the daytime when a mechanic is working on the car in a dimly lighted garage where the photocell would be activated to turn on the lights.

I claim:

1. An electrical system for the lights of a motor vehicle, comprising a battery, an electric line connecting the battery with the lights, a normally closed switch in said line, a manual switch in said line between the battery and said normally closed switch, electrically operated means for opening the normally closed switch and connecting the lights to the battery even though said manual switch is open, a normally open switch connected with said means, a photoelectric cell, a clock-actuated switch having a contact connecting the battery with said electrically operated means from substantially dusk to dawn and having another contact for connecting the battery with said normally open switch and cell from substantially dawn to dusk, and electrically operated means controlled by said cell for closing said normally open switch whenever the cell fails to receive a predetermined amount of illumination while it is connected with the battery.

2. An electrical system according to claim 1, including a manually operable switch for disconnecting said clock switch from the battery and which serves as the ignition switch for the vehicle.

3. An electrical system according to claim 1, in which said normally open switch and last-mentioned electrically operated means form a relay operated by said cell, said normally closed switch has a movable contact, and said first-mentioned electrically operated means include a fixed contact electrically connected with the battery, and a solenoid coil connected with the clock switch for moving said movable contact into engagement with said fixed contact, said system including a manually operable switch for disconnecting said clock switch from the battery whenever the vehicle ignition is turned off.

4. An electrical system according to claim 1, in which said normally closed switch has a movable contact, and said first-mentioned electrically operated means include a fixed contact electrically connected with the battery, and a solenoid coil connnected with the clock switch for moving said movable contact into engagement with said fixed contact.

5. An electrical system according to claim 1, in which said normally open switch and last-mentioned means form a relay operated by said cell.

6. An electrical system according to claim 1, including manually operable means for turning off the lights while the battery is connected with said first-mentioned electrically operated means.

7. An electric circuit according to claim 6, in which said manually operable means include a second normally closed switch in said line between said first-mentioned normally closed switch and the lights, electrically operated means for opening said second switch, and a manually operable normally open switch connecting said last-mentioned electrically operated means with said first-mentioned clock contact, whereby if said last-mentioned switch is closed manually between dusk and dawn and said second normally closed switch will be opened to turn off the lights.

8. An electrical system according to claim 7, in which said second normally closed switch and said means for opening it form a relay that is operated by closing said manually operable normally open switch.